United States Patent
Pedersen et al.

(10) Patent No.: US 9,179,526 B2
(45) Date of Patent: Nov. 3, 2015

(54) LIGHTING SYSTEM WITH ILLUMINANCE CONTROL

(71) Applicant: DANMARKS TEKNISKE UNIVERSITET, Lyngby (DK)

(72) Inventors: Henrik Chresten Pedersen, Jyllinge (DK); Henning Engelbrecht Larsen, Ølstykke (DK)

(73) Assignee: HeSa Light A/S, Roskilde (DK)

(*) Notice: Subject to any disclaimer, the term of this patent is extended or adjusted under 35 U.S.C. 154(b) by 0 days.

(21) Appl. No.: 14/405,531

(22) PCT Filed: May 31, 2013

(86) PCT No.: PCT/EP2013/061266
§ 371 (c)(1),
(2) Date: Dec. 4, 2014

(87) PCT Pub. No.: WO2013/186067
PCT Pub. Date: Dec. 19, 2013

(65) Prior Publication Data
US 2015/0173156 A1   Jun. 18, 2015

Related U.S. Application Data

(60) Provisional application No. 61/658,511, filed on Jun. 12, 2012.

(30) Foreign Application Priority Data

Jun. 12, 2012 (EP) ..................... 12171582

(51) Int. Cl.
*H05B 37/02* (2006.01)
*H05B 33/08* (2006.01)

(52) U.S. Cl.
CPC ........ *H05B 37/0227* (2013.01); *H05B 33/0848* (2013.01); *H05B 33/0872* (2013.01); *H05B37/0218* (2013.01); *H05B 37/0245* (2013.01); *H05B 37/0272* (2013.01); *Y02B 20/46* (2013.01); *Y02B 20/72* (2013.01)
(Continued)

(58) Field of Classification Search
CPC . H05B 37/0272; H05B 33/0848; Y02B 20/46
USPC .................................. 315/151, 294, 297, 307
See application file for complete search history.

(56) References Cited

U.S. PATENT DOCUMENTS

2009/0218951 A1   9/2009   Weaver
2009/0315466 A1   12/2009  Ko et al.
(Continued)

FOREIGN PATENT DOCUMENTS

CN   202177447   3/2012
EP   2395816     12/2011
(Continued)

OTHER PUBLICATIONS

"Advanced Street Lighting Technologies Assessment Project—City of San Diego", Final Report, San Diego Gas & Electric (Jan. 4, 2010) (96 pages).
(Continued)

*Primary Examiner* — Don Le
(74) *Attorney, Agent, or Firm* — Nixon Peabody LLP (57) ABSTRACT

The present invention relates to an illumination control system comprising a plurality of outdoor luminaries and a motorized service vehicle. Each luminaire comprises a controllable light source producing a light illuminance. The motorized service vehicle comprises a light sensor configured to detect the light illuminance generated by the controllable light source at the motorized service vehicle. The motorized service vehicle computes light illuminance data based on the detected light illuminance and transmits these to the outdoor luminaire through a wireless communication link or stores the light illuminance data on a data recording device of the motorized service vehicle. The outdoor luminaire receives may use the light illuminance data to set or adjust a light illuminance of the controllable light source.

25 Claims, 4 Drawing Sheets

(56) References Cited

U.S. PATENT DOCUMENTS

| | | | | |
|---|---|---|---|---|
| 2011/0163694 | A1* | 7/2011 | Donners | 315/297 |
| 2012/0062127 | A1 | 3/2012 | Tsai | |
| 2013/0009569 | A1* | 1/2013 | Knibbe et al. | 315/297 |
| 2014/0320025 | A1* | 10/2014 | Assoulin | 315/154 |
| 2015/0145698 | A1* | 5/2015 | Werner et al. | 340/928 |

FOREIGN PATENT DOCUMENTS

| | | |
|---|---|---|
| JP | 2002324686 | 11/2002 |
| JP | 2005100764 | 4/2005 |
| JP | 2005100765 | 4/2005 |
| WO | WO 2009072053 | 6/2009 |
| WO | WO 2013186067 | 12/2013 |

OTHER PUBLICATIONS

Gibbons, "Advanced Roadway Delineation and Lighting Systems", VirginiaTech Transportation Institute (20 pages).

Johnson, et al. Embedded System Design of an Advanced Illumination Measurement System for Highways, 978-1-4799-2086-0/14, IEEE (2014) (8 pages).

"LightSavers Monitoring and Evaluation Protocol for the Field Performance of LED Street Lighting Technologies", Toronto Atmospheric Fund (32 pages).

"LX-GPS" Sensor, AFEISA (1986) (2 pages).

"Proyecto POLUX", Smart City Expo, Ref. IPT 2011-1675-020000 (2011) (10 pages).

Zatari et al. "Glare, Luminance, and Illuminance Measurements of Road Lighting Using Vehicle Mounted CCD Cameras", downloaded by Reprints Desk Inc. (Nov. 24, 2014) (22 pages).

Zhou et al. "A new roadway lighting measurement system", Elsevier Ltd., Transportation Research Part C, 17:274-284 (2009) (11 pages).

PCT International Search Report for International Application No. PCT/EP2013/061266, mailed Jun. 28, 2013 (3 pages).

PCT Written Opinion for International Application No. PCT/EP2013/061266, mailed Jun. 28, 2013 (6 pages).

\* cited by examiner

LIGHTING SYSTEM WITH ILLUMINANCE CONTROL

CROSS-REFERENCE TO RELATED APPLICATIONS

This application is a U.S. National Stage of International Application No. PCT/EP2013/061266, filed May 31, 2013, which claims the benefit of U.S. Provisional Patent Application No. 61/658,511, filed Jun. 12, 2012, and which claims the benefit of European Patent Application No. 12171582.5, filed Jun. 12, 2012, all of which are incorporated herein by reference in their entireties.

The present invention relates to an illumination control system comprising a plurality of outdoor luminaries and a motorized service vehicle. Each luminaire comprises a controllable light source producing a light illuminance. The motorized service vehicle comprises a light sensor configured to detect the light illuminance generated by the controllable light source at the motorized service vehicle. The motorized service vehicle computes light illuminance data based on the detected light illuminance and transmits these to the outdoor luminaire through a wireless communication link or stores the light illuminance data on a data recording device of the motorized service vehicle. The outdoor luminaire may use the light illuminance data to set or adjust a light illuminance of the controllable light source.

BACKGROUND OF THE INVENTION

It is important to secure that an appropriate light illuminance is provided by street and road lighting systems comprising a plurality of outdoor luminaries or luminaires. The light illuminance generated by each luminaire should preferably lie within prescribed limits at the road or ground level to ensure an even and adequate lighting along the road stretch or area in question. However, because of dirt and age depreciation, the illuminance generated by each lamp may vary considerably and differently over time, leading to an uneven light distribution. It is one object of the present invention to provide an illuminance control system that compensates for the depreciation.

LED based outdoor luminaries gain popularity since LEDs provide significant energy savings over conventional light sources. Additionally, a longer life time of LEDs, approx. 5 times the lifetime of existing bulbs, leads to large potential savings in maintenance and service costs of the road lighting system. However, there exist a number of unsolved problems in the application of LED based light sources for outdoor lighting. The long lifetime of LEDs is accompanied with a significant luminance depreciation or decrease of approximately 30% during the lifetime due to aging of the semiconductor material. Moreover, the luminance depreciation over time is unfortunately difficult to predict because it amongst other factors depends on unpredictable environmental conditions such as temperature.

Hence, it would be highly desirable to provide an illumination control system which in a rapid manner is capable of determining or measuring actual light illuminance of each of the outdoor luminaries at a relevant position such as at the road or ground level below the light source. It is also desirable to provide the illumination control system with a mechanism which enables nearly instantaneous correction of the illuminance of each outdoor luminaire after the actual light illuminance at the road or ground level has been measured.

JP 2002/324686 A2 discloses an illuminance monitoring system comprising a plurality of road lamps or luminaries (LA, LB, LC etc.) communicating wirelessly with a travelling motorized service vehicle. The illuminance monitoring system also comprises light sensors detecting the light intensity emitted by each lamp. The light sensor/photo-detector of the lamp monitor circuit is placed inside the lamp monitor attached to the lamp pole. The lamp monitor is measuring and evaluating the light intensity of each of the street lamps to detect normal or abnormal illuminance data for each luminaire and wirelessly transmits that information to the bypassing motorized service vehicle. The bypassing service vehicle records the condition and position of the defective road lamps for later repair.

JP 2005/100765 discloses an illuminance monitoring system comprising a plurality of road lamps or luminaries (A, B, C etc.) communicating wirelessly with a bypassing or travelling patrol car. The illuminance monitoring system includes light sensors of a lamp monitor circuit detecting the light intensity emitted by each lamp. The lamp monitor circuit is attached to the lamp pole.

The position of the light sensor on the lamp pole in the above summarized patent applications raises a number of technical problems since: (i) the light sensor may be exposed to dirt and therefore give a false reading, (ii) as the light illuminance detected at the lamp pole is not a direct measurement of the illuminance at the road level, computing efforts would be required to correlate these illuminances (iii) a sensor placed at the lamp pole is not capable of detecting an unintended, uneven light illuminance at the road (due to uneven dirt depreciation at the lamp house or due to a lamp pole that is accidentally tilted).

The present invention addresses these problems and numerous others as described in further detail below.

SUMMARY OF THE INVENTION

A first aspect of the invention relates to an illumination control system comprising a plurality of outdoor luminaries and a motorized service vehicle. Each luminaire comprises a controllable light source producing a light illuminance. A light source controller is operatively coupled to the light source and configured to set or adjust a light illuminance of the controllable light source based on received light Illuminance data. A first data communication unit is configured to receive the light illuminance data from the motorized service vehicle or a remote central server through a wireless or wired communication link. The motorized service vehicle comprises a light sensor configured to detect the light illuminance at the motorized service vehicle of the controllable light source. The motorized service vehicle additionally comprises a service device controller operatively coupled to the light sensor to receive the detected light illuminance and compute the light illuminance data based thereon.

The present illumination control system is capable of determining or measuring the actual light illuminance of each of the outdoor luminaries at the road or ground level due to the light sensor of the motorized service vehicle. The motorized service vehicle preferably comprises a vehicle such as a car, a van, a motor cycle, a moped, a bicycle or scooter etc. to allow rapid measurement of the light illuminance of a large number of outdoor luminaries spread out over a considerable geographical area. Furthermore, since the light sensor is mounted on the motorized service vehicle, it is also uncomplicated for relevant personnel to ensure that the light sensor functions correctly e.g. is unaffected by dirt or pollution that could attenuate light input to the sensor and therefore lead to erroneous light illuminance measurements. The light sensor or detector is preferably firmly attached to a chassis structure or a body structure of the motorized service vehicle to fix an orientation of the light sensor. This chassis structure or a body structure may be a suitable exterior surface, such as a roof, of the motorized service vehicle such that light generated by the outdoor luminaire can illuminate the light sensor in an unobstructed manner. The light sensor may alternatively be mounted on an interior surface of the chassis or body structure inside the motorized service vehicle for example behind a suitable transparent cover or glass. The fixed orientation of the light sensor during light illuminance measurements is important to ensure correct and predictable measurements of the light illuminances of the outdoor luminaries.

The skilled person will appreciate that the light illuminances of the outdoor luminaries detected or measured by the motorized service vehicle can be utilized in various ways to adjust or set the respective light illuminances of the controllable light sources. In accordance with a preferred embodiment, the service device controller is configured to store the respective light illuminance data of the plurality of outdoor luminaries on a data recording device of the motorized service vehicle. This embodiment allows the motorized service vehicle to transmit or transfer the stored light illuminance data to the remote central server for example upon arrival at a central control or surveillance center. According to this embodiment, the remote central server comprises a data storage device for receipt of the stored light illuminance data held on the data recording device of the motorized service vehicle and a second data communication unit configured to transmit the respective light illuminance data to the light source controllers of the plurality of outdoor luminaires through the first wired or wireless communication links. In this manner, the remote central server addresses each of the outdoor luminaires and transmits the appropriate light illuminance data thereto. The data communication link between the remote central server and the outdoor luminaires may for example comprise a wired LAN network or a wireless cellular network such as a GSM based network.

In another embodiment, motorized service vehicle is configured to transmit the light illuminance data directly to the outdoor luminaries substantially immediately after the light illuminance has been detected while passing by the luminaire. According to this embodiment, the motorized service vehicle comprises a second data communication unit configured to wirelessly transmit the light illuminance data to the light source controller of the outdoor luminaire through the wired or wireless communication link.

The skilled person will appreciate that the advantages provided by present illumination control system can be applied to numerous types of light sources where ageing and/or contamination of luminaire housings contribute to depreciate the light output over time, in particular where the light illuminance changes in an unpredictable manner. Without any corrective action, these factors may lead to a light illuminance beyond acceptable limits and/or uneven light illuminance from one outdoor luminaire to another at the road level. However, in the present illumination control system the light illuminance data computed by the light source controller of the motorized service vehicle, based on the measured light illuminance generated by the luminaire at the street or ground level, are utilized to adjust the light illuminance generated by the light source of the outdoor luminaire. The computed light illuminance data may be directly transmitted to the light source controller of the luminaire according to the above-mentioned embodiment to provide a mechanism that allows rapid, or essentially instantaneous, up or down adjustment of the light illuminance and/or change of the light spectrum of the luminaire if such correction is required. In the outdoor luminaire, the light source controller or luminaire controller utilizes the received light illuminance data to determine the required adjustment of the controllable light source e.g. to reach a target or nominal light illuminance at the road level. The controller may comprise a programmable or controllable driver circuit for the controllable light source. The controller may adjust the power supplied to the adjustable light source by the controllable driver circuit for example by adjustment of an average current or voltage supplied to the light source through the driver such that the light illuminance is appropriately adjusted.

The skilled person will understand that the light illuminance data may represent the measured light illuminance in numerous ways. The first and second controllers understand how the light illuminance data are represented to appropriately read, write and manipulate these. The service device controller may be adapted to compute the light illuminance data for each outdoor luminaire based on a comparison between the measured or detected light illuminance at the light sensor and a predetermined or nominal light illuminance of the luminaire. The nominal light illuminance of the luminaire may comprise a factory setting of the controllable driver circuit for a particular drive voltage or current. In this situation the light illuminance data may reflect a difference between the measured light illuminance and the nominal light illuminance so as to represent a light illuminance deviation that may be zero, positive or negative. When this type of light illuminance data are utilized, the luminaire controller may be adapted to compute a required increase or decrease of power, voltage or current to be supplied to the controllable light source to reach the nominal light illuminance of the luminaire.

In another embodiment, the light illuminance data computed by the service device controller may reflect an absolute power/voltage current level to be applied to the controllable light source. This scheme can for example be applied if the luminaire controller initially transmits a current setting of the light illuminance of the controllable light source to the service device controller. The service device controller may compute an appropriate absolute setting of the light illuminance based on a determined deviation between the measured light illuminance generated by the controllable light source and a known nominal light illuminance of the latter.

The wireless communication link may be integrated together with the first and second data communication units. The wired or wireless communication link is preferably a bi-directional data communication link or data communication channel that allows data to be transmitted in both directions between the motorized service vehicle or the remote central server and each of the outdoor luminaries. However, some embodiments may comprise a unidirectional link or data channel such that light illuminance data can still be transmitted from the motorized service vehicle or the remote central server to each of the luminaries. However, numerous benefits are naturally associated with the bi-directional data communication link such as allowing the luminaire to acknowledge receipt of the transmitted light illuminance data and exchange of other types of useful data such as positional data and ID's from the luminaire to the motorized service vehicle. The bi-directional wired or wireless communication link is preferably operating in accordance with a standardized wired or wireless communications standard and protocol to keep component costs low and parts availability high for the first and second data communication units. A wireless embodiment of the bi-directional communication link may accordingly comprise a Bluetooth communication interface or a Wi-Fi communication link etc. In the alternative, the bi-directional wireless communication link may comprise a customized wireless RF or optical data link. The customized wireless RF link is preferably adapted for data reception and transmission within frequency bands allocated under ISM (Industrial, Scientific and Medical) such as 2.4 GHz, 433 MHz etc.

The wireless communication link is preferably adapted to transmit the light illuminance data directly, i.e. without any intervening remote central control center or relay station or mast, between the motorized service vehicle and each of the luminaries. The wireless communication link may transmit the light illuminance data to each of the outdoor luminaries while the motorized service vehicle is located in close proximity to the luminaire for example when the motorized service vehicle passes by the luminaire or is parked below the luminaire. This embodiment does not require a data communication network coupling the plurality of luminaries to the previously discussed remote central computer and control center because the light illuminance adjustment is performed locally at the position of the outdoor luminaire. This is a significant advantage because it makes the illumination control system more resistant to network errors, natural disasters or terrorist attacks. Furthermore, the possibility to perform a nearly instantaneous adjustment of the light illuminance of a misaligned outdoor luminaire allows the service personnel to immediately check and verify the correctness of the applied adjustment of the light illuminance.

The optical data link has certain advantageous features compared to RF based communication links such as being insensitive to interference from the plurality of RF transmitters operating in the often crowded standardized RF bands. Furthermore, optical waves can be made highly directive which makes it simple to address and communicate with only a single outdoor luminaire at a time. Finally, the high directivity of the optical waves makes it difficult for unauthorized persons to intercept data exchanged through the bi-directional wireless communication link in connection with the measurement and adjustment process of the outdoor luminaire.

However, the wireless communication link may alternatively comprise a GSM cellular interface or similar relayed communication networks.

In a preferred embodiment of the invention, the light source comprises one or more Light Emitting Diodes (LEDs) for example between 20 and 200 white LEDs. As mentioned above, the long lifetime of LEDs is accompanied with a light illuminance decrease of approximately 30% during the lifetime due to aging of the semiconductor material. Hence, the present invention is highly useful to accurately measure and correct for the specific light illuminance depreciation of each outdoor luminaire. Each of the each outdoor luminaries may be programmed with new light illuminance data during the above-described measurement and programming session at regular time intervals for example one or two times per year.

In yet another embodiment of the invention, the light illuminance data comprises a night dimming profile reducing the predetermined light illuminance of the luminaire during a predetermined dimming time period of the day. The luminaire processor uses the night dimming profile to determine the period of time where the light illuminance should be lowered. The lowered light illuminance may correspond to between 20 and 60% of the predetermined light illuminance such as about 40% thereof. The night dimming profile is useful for saving energy during at least a period of the night time where the level of traffic is assumed to be low. However, since the duration of the dark time varies through the year, there is need for adjusting the night dimming profile to adapt the dimming period to the time of year. This can conveniently be achieved by this embodiment of the illumination control system by driving the motorized service vehicle through the relevant areas or road stretches and program the relevant set or group outdoor luminaries with an updated night dimming profile through the wireless communication link. The first and second data communication units may be configured to exchange luminaire position data, or another unique identifier, of the luminaire, through the wireless communication link. The luminaire position data, or another unique identifier, may be stored in a non-volatile memory area accessible for the luminaire controller. The luminaire position data and/or other unique identifier may be read and transmitted by the luminaire controller through the first and second data communication units on request from the controller of the motorized service vehicle or automatically as part of a predetermined communication session or protocol. The luminaire position data could for example comprise GPS coordinates or a unique ID indirectly indicating the location of the outdoor luminaire relative to a certain geographic map. In both instances, the controller of the motorized service vehicle is able to register and record a measured light illuminance for each specific luminaire. In a preferred embodiment of the invention, the motorized service vehicle comprises a GPS receiver and associated route guide or planner. The route planning tool can guide service personnel transporting the motorized service vehicle through a predetermined route along which the plurality of outdoor luminaries to be adjusted is placed. The GPS receiver and route planner can notify the service personnel if they accidentally leave the planned route for example by taking a wrong turn and hence provide the service personnel with increased freedom in choosing the sequence in which the outdoor luminaries are serviced.

For previously discussed data recording purposes, the motorized service vehicle may comprise an optical disc drive, a magnetic disc drive or a non-volatile electronic memory area storing respective detected light intensities, or the computed light illuminance data, of the plurality of outdoor luminaries. In the alternative, the data recording device can be located in the previously discussed remote central server and an on-line wireless connection thereto provided in the motorized service vehicle such that detected light intensities are transmitted to the central server for storage. This gathering of light illuminance data allows the overall illumination performance to be evaluated or analyzed for a selected subgroup of the plurality of outdoor luminaries. The overall illumination performance may be evaluated in the central supervision center after read-out of data stored on the data recording device. The selected subgroup of outdoor luminaries can for example cover a particular road stretch, a parking lot etc. and appropriate maintenance activities, such as cleaning or lamp adjustment, may be initiated.

A highly advantageous embodiment of the present illumination control system comprises a feature that allows the service device controller to make a particularly accurate measurement of true light illuminance emitted by each of the plurality of outdoor luminaries by eliminating, or at least suppressing, background light pollution/noise. In this embodiment, the luminaire controller is configured to pulsate the light illuminance of the light source between a first illuminance level and a second illuminance level in response to receipt of a data command transmitted by the service device controller in the motorized service vehicle through the wireless communication link. The background light pollution/noise may enter or infect light at the light detector during measurement of the light illuminance and lead to erroneous light illuminance measurements if unaccounted for. The background light pollution can be induced by numerous types of light sources such as head lights of a bypassing vehicle, light from other installations or light from a neighbouring luminaire.

The generation of the pulsed light illuminance is preferably initiated by issuance of the data command once the motorized service vehicle approaches the luminaire to be measured or tested. As mentioned above, this data command is registered by the luminaire controller which in response sets the light source in a pulsating mode or state to generate a corresponding pulsating light illuminance below the outdoor luminaire at the light sensor of the motorized service vehicle. The first illuminance level of the pulsating drive signal may correspond to substantially zero light illuminance generated by the light source while the second illuminance level may be significantly higher than any background lighting or pollution. The service device controller is now capable of determining true light illuminance of the luminaire based on a measured light illuminance difference between the first and second illuminance levels at the light detector. The differential measurement ensures that influence of background light on the measurement of the light generated by the controllable light source is effectively suppressed as explained in further detail below in connection with FIG. 3. The skilled person will appreciate that the difference between the first and second illuminance levels may be detected in the time domain or in the optical spectral domain as explained in further detail below.

According to another beneficial embodiment of the present illumination control system the motorized service vehicle comprises an optical spectrum analyser for determining a spectral distribution of light received at the light detector. The analysis of the optical spectrum has several advantages. In one embodiment, the analysis of the spectral distribution of light transmitted by the outdoor luminaire makes it possible to determine an error mechanism responsible for a reduced light illuminance. Thus, the spectral distribution may for example indicate whether an observed depreciation is caused by ageing or dirt. Consequently, service personnel can determine an appropriate corrective measure right away leading to lower service and maintenance costs. Another way to exploit the measured optical spectrum is for adjusting the spectrum of the light emitted by the controllable light source. In this embodiment, the controllable light source comprises:

- a set of white Light Emitting Diodes (LEDs) operatively coupled to the light source controller,
- at least one coloured Light Emitting Diode operatively coupled to the light source controller. The light source controller is furthermore configured to, based on the received light illuminance data, selectively adjust the light illuminance of the set of white Light Emitting Diodes and the at least one coloured Light Emitting Diode to change the spectrum of the light emitted by the controllable light source. The coloured LED preferably comprises a red LED because ageing of the phosphorus of the white LEDs shifts the emitted light spectrum towards blue which can be compensated by an appropriate increase of the light illuminance of the at least one red LED.

A second aspect of the invention relates to a motorized service vehicle for measuring a light illuminance of an outdoor luminaire. The motorized service vehicle comprises a light sensor mounted to a structure of the motorized service vehicle and configured to detect the light illuminance generated by the outdoor luminaire. A service device controller is operatively coupled to the light sensor for receipt of a measured light illuminance signal and compute light illuminance data for the outdoor luminaire based thereon. The motorized service vehicle furthermore comprises at least one of: a data communication unit configured to transmit the light illuminance data to the outdoor luminaire through a wireless communication link to the outdoor luminaire; and a data recording device configured to store the respective light illuminance data of the plurality of outdoor luminaries.

The skilled person will understand that the various features of the motorized service vehicle described in detail above in connection with the illumination control system are applicable to the motorized service vehicle according this aspect of the invention as well. The fact that the light sensor is mounted to the motorized service vehicle allows the controller to receive and measure the light illuminance of the outdoor luminaire at the relevant position at ground or road level. The motorized service vehicle may be a portable unit, for example build around a laptop computer, smartphone, tablet etc., with a sufficiently compact size and weight to be carried by hand by the service person. Preferably, the light illuminance is measured within the illumination zone of the outdoor luminaire which often is located below the light source of the luminaire.

A third aspect of the invention relates to a method of setting or adjusting light illuminance of an outdoor luminaire from a bypassing motorized service vehicle. The method comprising steps of:

- driving the motorized service vehicle to a road position within an illumination zone of the outdoor luminaire,
- detecting a light illuminance generated by a controllable light source of the outdoor luminaire by a light sensor mounted on the motorized service vehicle,
- comparing the detected light illuminance to a predetermined target illuminance of the luminaire,
- computing new light illuminance data for the outdoor luminaire based on the comparison,
- transmitting the computed light illuminance data to the outdoor luminaire from the motorized service vehicle or from a remote central server through a wired or wireless communication link,
- adjusting the light illuminance of the controllable light source in accordance with the light illuminance data by a light source controller operatively coupled to the controllable light source.

The skilled person will understand that the motorized service vehicle may be driving through the illumination zone of the outdoor luminaire in question without stopping during the measurement and subsequent adjustment of the light illuminance of the luminaire. Hence, the methodology of setting or adjusting the light illuminance may comprise a further step of wirelessly transmitting the light illuminance data from the motorized service vehicle to the light source controller of the outdoor luminaire through a wireless communication link during passage of the outdoor luminaire. Alternatively, the motorized service vehicle may be temporarily parked below the outdoor luminaire. Furthermore, the service device controller may be adapted to perform a plurality of light intensity measurement when it passes through the illumination zone of the outdoor luminaire to determine a maximum light intensity in the zone. The detected light intensity may be set equal to the maximum light intensity and used for the comparison to the predetermined or nominal light intensity.

The present methodology of setting or adjusting light illuminance of an outdoor luminaire may comprise a step of transmitting a data command from the service device controller to the light source controller through the wireless communication link to pulsate the light illuminance of the controllable light source between a first illuminance level and a second illuminance level. This embodiment has the previously discussed advantages of suppressing or eliminating background light pollution or noise. In particular when the light illuminance of the outdoor luminaire is determined, based on a measured light illuminance difference between the first and second illuminance levels at the light detector.

Another advantageous embodiment of the present methodology likewise exploits the pulsating light illuminance of the controllable light source, but applies frequency domain detection to suppress the background light pollution and thereby determine the true light illuminance of the outdoor luminaire. The latter methodology comprises further steps of:

pulsating the light illuminance of the luminaire at a predetermined pulsation frequency,
computing an optical spectrum of the detected light illuminance,
detecting the light illuminance generated by the controllable light source based on the optical spectrum.

The light source pulsation frequency may for example lie between 100 Hz and 10 kHz such as about 1 kHz. According to another refinement of the present methodology, the controllable light sources of adjacent outdoor luminaires may be programmed to pulsate at different frequencies than the predetermined frequency of the outdoor luminaire under adjustment such that interfering light or noise from the adjacent outdoor luminaires to the outdoor luminaire under adjustment can be identified and suppressed in the detected optical spectrum. This interference suppression technique becomes readily available because the respective light illuminances emitted by the adjacent outdoor luminaires are spectrally separated from the predetermined pulsation frequency of the light illuminance of the outdoor luminaire under adjustment.

BRIEF DESCRIPTION OF THE DRAWINGS

Preferred embodiments of the invention will be described in more detail in connection with the appended drawings, in which.

DETAILED DESCRIPTION OF PREFERRED EMBODIMENTS

Figure 1:
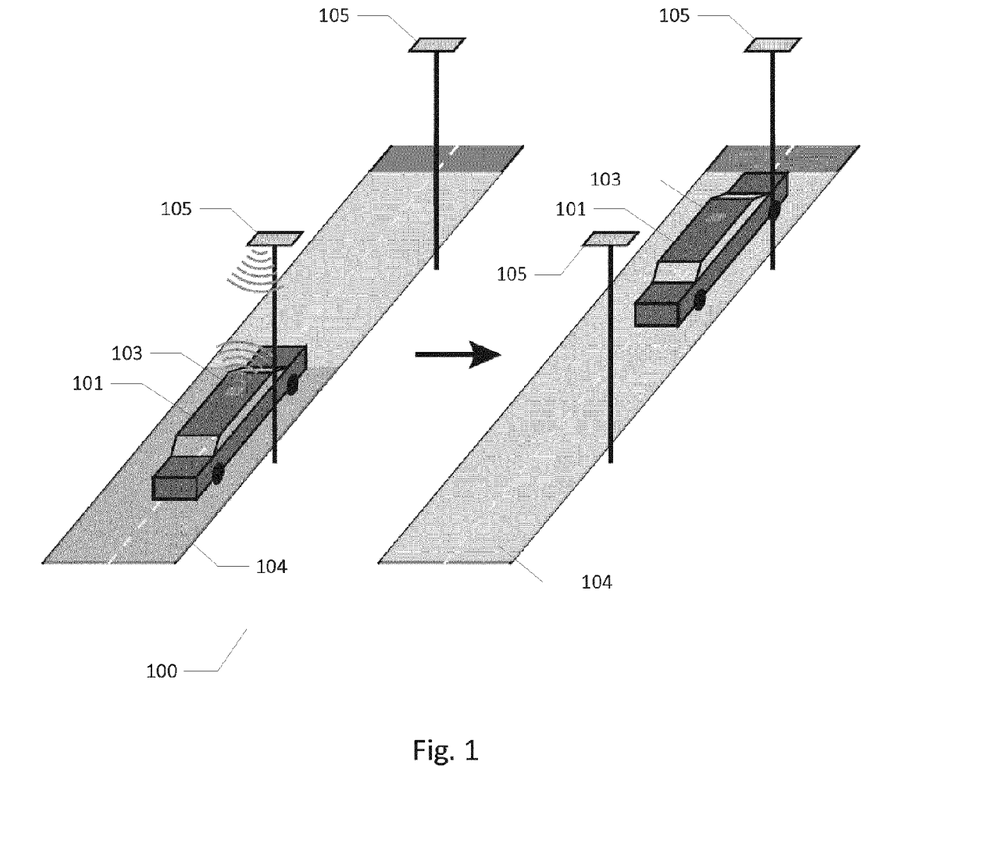
FIG. 1 illustrates an illumination control system comprising a motorized service vehicle and a plurality of outdoor luminaries in accordance with a preferred embodiment of the invention.

FIG. 1 illustrates schematically an illumination control system 100 comprising a plurality of outdoor luminaries 105 in accordance with a preferred embodiment of the invention. The illumination control system 100 preferably comprises a plurality of outdoor road luminaries 105 such as between 10 and 10.000. The illumination control system 100 furthermore comprises a motorized service vehicle 101 such as a car, a van, a motor cycle, a moped, an electrical bi-cycle etc. driven a service person The motorized service vehicle 101 comprises a light sensor or detector 103 which may be firmly attached to a suitable exterior chassis structure or body structure of the vehicle 101 keeping a fixed and known orientation of the light sensor or detector 103. Thereby, light generated by each of the plurality of outdoor luminaries 105 is able to travel to and illuminate the light sensor 103 in an unobstructed manner when the motorized service vehicle 101 passes the outdoor luminaire in question. A service device controller (not shown) placed in the motorized service vehicle 101 is adapted to receive and process the measured light illuminance at the light sensor 103 mounted to the motorized service vehicle 101. The service device controller computes light illuminance data based on the measured light illuminance at the light sensor 103 and sequentially transmits the respective illuminance data to light source controllers mounted in the outdoor luminaries 105 for example in proximity of a light source housing. The service device controller may be adapted to compute the light illuminance data based on a comparison between the detected light illuminance at the light sensor 103 and a predetermined target light illuminance of the luminaire 105 as explained in further detail below. The service device controller transmits the computed light illuminance data to each of the outdoor luminaries 105 when it passes by the luminaire 105 in question at the road 104 as illustrated on the left drawing. The computed light illuminance data are transmitted via a data communication unit and an associated bi-directional wireless communication link (not shown) as explained in detail below. Each of the outdoor luminaries 105 comprises a data communication unit (not shown) for receipt of the transmitted light illuminance data via the bi-directional wireless communication link. The data communication unit transmits the received light illuminance data to the associated luminaire controller (not shown on FIG. 1) for example via a wired data bus or link. The luminaire controller is electrically coupled to a controllable light source (not shown) in the luminaire 105 and adapted to set or adjust a light illuminance of the controllable light source based on received light illuminance data as explained in further detail below. While the motorized service vehicle 101 passes by the first outdoor luminaire 105, it accordingly measures and evaluates the generated light illuminance at the road level within an illumination zone of the first outdoor luminaire 105, computes the corresponding light illuminance data and transmits these data to the luminaire controller of the first outdoor luminaire 105 as schematically illustrated on the left side drawing. The luminaire controller evaluates the received light illuminance data and performs an appropriate correction of the light illuminance of the controllable light source of the outdoor luminaire if required. A correction of the light illuminance may for example be required because the measured light illuminance at the light detector 103 indicates the illuminance to fall outside predetermined light illuminance limits for example outside upper and lower illuminance limits. The measured light illuminance may for example fall below the lower light illuminance limit due to aging of the controllable light source or accumulation of dirt stuck on a lens of a housing glass of the outdoor luminaire 105. Once corrective light illuminance data has been transmitted from the motorized service vehicle 101 to the first outdoor luminaire 105, and possibly acknowledged by the light source controller of the first outdoor luminaire 105, the motorized service vehicle 101 proceeds to the second outdoor luminaire 105 where the above communication session, light illuminance measurement, computation and transmission of light illuminance data repeats and so on until each of the outdoor luminaries has been measured and appropriately adjusted if required. Furthermore, in one embodiment of the invention, the service device controller re-measures the light illuminance at the light sensor 103 and verifies that the adjusted light illuminance emitted by the luminaire 105 complies with the predetermined light illuminance limits. After completion of this adjustment procedure, the road illuminance will be homogeneous, as illustrated on the drawing to the right. The present inventors have built and evaluated an experimental prototype of the present illumination control system and verified that it is possible to drive the motorized service vehicle through the illumination zone of the outdoor luminaire with a speed at or above 50 km/h and still reliably perform the described light illuminance measurement and subsequent light illuminance adjustment of the luminaire using wireless communication between the outdoor luminaire and motorized service vehicle.

Figure 2:
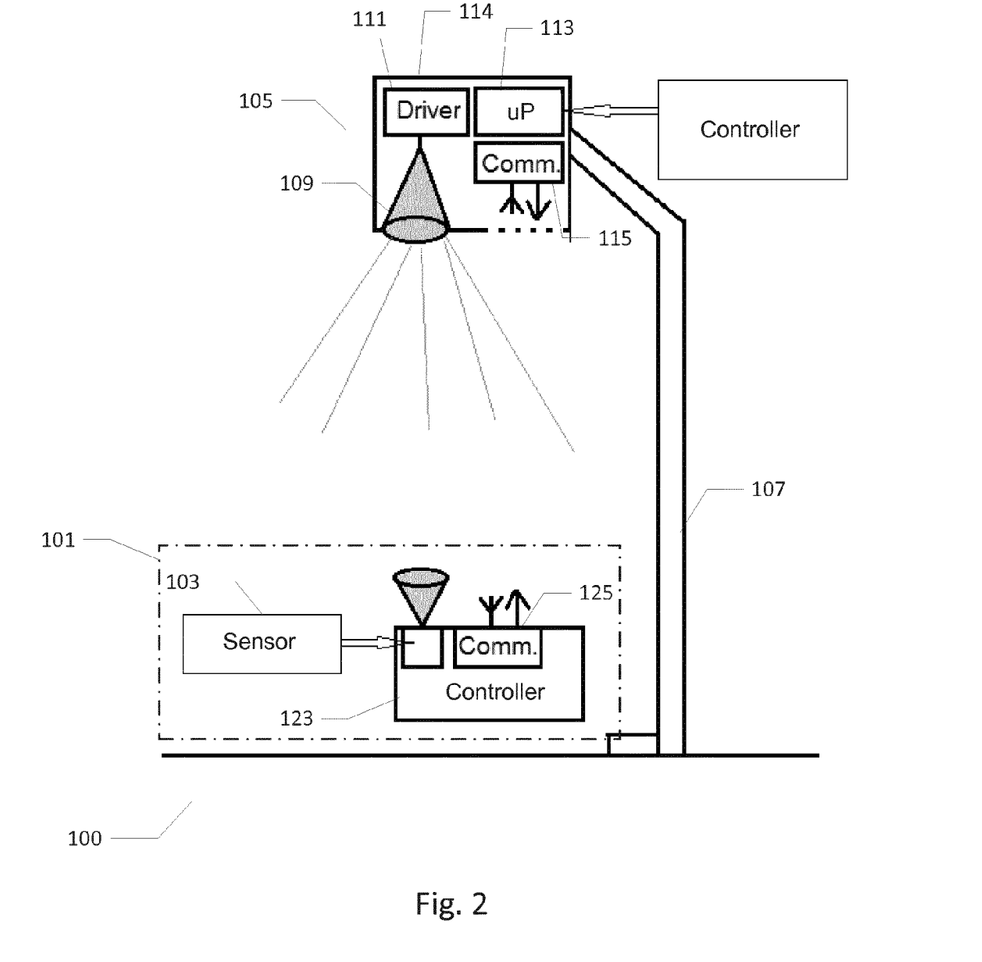
FIG. 2 shows a detailed block diagram of the outdoor luminaire and a detailed block diagram of the motorized service vehicle.

FIG. 2 is a schematic block diagram of the outdoor luminaire 105 and a schematic block diagram of the motorized service vehicle 101 placed at street level below the outdoor luminaire 105 approximately at the center of a lighting zone of the outdoor luminaire 105. The outdoor luminaire 105 comprises a lamp housing 114 enclosing the controllable light source 109 and various electronic control and communication circuitry. The outdoor luminaire 105 further comprises a pole 107 supporting the lamp housing 114. The controllable light source 109 preferably comprises a LED based light source since LEDs provide significant energy savings over conventional light sources. Additionally, the longer life time of LEDs, approx. 5 times the life time of existing bulbs, leads to significant savings in maintenance and service costs. The controllable light source 109 is supplied with power by a programmable or controllable driver circuit 111 that can vary the amount of power such as current or voltage supplied to the light source 109 and thereby controls the generated light illuminance. The driver circuit 109 may comprise a PWM modulator coupled to the LED based light source such that applied power can be varied by controlling a duty cycle of the PWM waveform applied to the light source. In the alternative, the driver circuit 109 may be adapted to provide an essentially constant power level adapted to provide the required illumination level.

The luminaire controller 113 may comprises a pre-programmed setting of the light illuminance of the controllable light source 109. This pre-programmed setting is preferably stored in a non-volatile memory area of the luminaire controller 113 for example in EEPROM or flash memory. Consequently, the outdoor luminaire 105 can provide light of suitable illuminance in the designated illumination zone immediately after installation without any contact with the motorized service vehicle 101. The skilled person will appreciate that the luminaire controller 113 may comprise various other types of data that could be helpful for operation of the present an illumination control system 100. In one embodiment, each of the luminaries comprises a unique ID and/or positional data that is/are transmitted to the motorized service vehicle 101 through the wireless communication link as part of the communication session in connection with light illuminance measurement and adjustment. The luminaire position data could for example comprise GPS coordinates. In this manner, the controller 123 of the motorized service vehicle is capable of registering and recording a measured light illuminance value for each specific luminaire 105. For this purpose, the motorized service vehicle may comprises a data recording device (not shown) such as an optical disc drive, a magnetic disc drive, a volatile or non-volatile electronic memory area storing light intensities of the plurality of outdoor luminaries or have on-line access to a remote central server. This allows the overall illumination performance of a selected subgroup of the plurality of outdoor luminaries 105 to be performed in a remote control or supervision center. The selected subgroup of outdoor luminaries 105 can for example cover a particular road stretch, a parking lot etc.

The luminaire controller 113 is operatively coupled to the light source 109 and is configured to control its light illuminance as mentioned above for example by controlling a duty cycle of the PWM modulator or adjusting a DC supply voltage or DC supply current applied by the driver 11 to the light source 109. The controller 113 comprises a programmable microprocessor in the present embodiment of the invention such that the functionality of the controller 113 can be conveniently modified or updated by software updates. A non-volatile memory may be coupled to, or integrated with, the controller to allow permanent storage of the software program executed by the controller 113 to perform the above-mentioned tasks. The skilled person will understand that the controller in the alternative may comprise a hard-wired digital state machine implemented on customized integrated circuit (e.g. an ASIC) and/or programmable logic or any combination of these. The luminaire controller 113 is operatively coupled to the data communication unit 115 for receipt of the light illuminance data transmitted from the motorized service vehicle 101. The light illuminance data may for example be transmitted from the data communication unit 115 to the luminaire controller 113 by a standardized data bus comprising data bus structure and protocols like SPI, IIC, USB etc. The luminaire controller 113 may comprise a suitable interface supporting the standardized data bus. The data communication unit 115 comprises, or is interfaced to, the previously-mentioned bi-directional wireless communication link. The bi-directional wireless communication link is preferably operating in accordance with standardized wireless communication standard and protocol to keep component costs low and parts availability high. The bi-directional wireless communication link may accordingly comprise a Bluetooth communication interface or a Wi-Fi communication link etc. which transmits the light illuminance data directly between the motorized service vehicle 101 and the luminaire 105. However, the bi-directional wireless communication link may also comprise a GSM cellular interface or customized wireless communication interface e.g. an optical interface comprising an optical transmitter and receiver pair as lamp communication unit 115 and vehicle communication unit 125.

The light sensor or detector 103 is fixedly mounted on the exterior chassis or body of the motorized service vehicle 101 as explained above. The light sensor or detector 103 may comprise various types of photosensors or photodetectors such as an active pixel sensor, a CCD etc. The light sensor 103 preferably comprises a transparent cover which protects it and simplifies cleaning to increase its robustness making it suitable for operating under harsh environmental conditions. A service device controller 123 is placed in the motorized service vehicle 101 and preferably comprises a programmable microprocessor that may be an integral part of a personal computer such as a portable or handheld laptop computer. The service device controller 123 is adapted to receive and process the measured light illuminance at the light sensor 103. The measured light illuminance may be provided in digital format by the light sensor 103 and transmitted through a suitable data bus such as SPI, IIC, USB etc. Alternatively, the measured light illuminance may be transmitted as an analog illuminance signal which is sampled by an A/D converter in the controller 123 for example by a build-in or integrated converter of the microprocessor. The service device controller computes light illuminance data based on the measured light illuminance at the light sensor 103 as mentioned above. The controller may be adapted to compute the light illuminance data based on a comparison between the measured or detected light illuminance at the light sensor 103 and a predetermined or nominal light illuminance of the luminaire 105. In this situation the light illuminance data may reflect a difference between the measured light illuminance and the nominal light illuminance and accordingly be interpreted as representing a light illuminance error that may be zero, positive or negative. When this type of light illuminance data are transmitted to the luminaire controller 113, the latter may exploit these data to compute the required increase or decrease of power, current or voltage to the controllable light source to bring the emitted light illuminance back to the nominal light illuminance of the luminaire 105. In another embodiment, the light illuminance data may reflect the actual power/voltage current level to be applied to the programmable or controllable driver circuit 111 such that the luminaire controller 113 computes an appropriate setting of the programmable or controllable driver circuit 111.

The illumination control system 100 comprises a feature that allows the service device controller 123 to make a particularly accurate measurement of the actual light illuminance generated by a particular outdoor luminaire 105 by eliminating or at least suppressing background light pollution/noise. This background light pollution/noise may infect the illumination zone during measurement of the light illuminance and lead to erroneous light illuminance measurements if unaccounted for. The background light pollution could be induced by head lights of a bypassing car driving in an opposite lane of the road 104. The light pollution suppression applied in the present embodiment of the invention is created by letting the controllable light source 109 of the luminaire 105 emit pulsed light illuminance during measurement of the light illuminance by the light sensor 103. The pulsed light illuminance is preferably toggling between a first illuminance level and a second illuminance level. The generation of the pulsed light illuminance is initiated by a control or mode signal transmitted from the service device controller 123 through the bi-directional communication link once the motorized service vehicle 105 approaches the luminaire 105. This control signal or command is registered by the luminaire controller 113 which in response instructs the programmable or controllable driver circuit 111 to apply a pulsating drive signal to the light source 109 rather than an essentially constant drive signal which is the preferred default state or mode. The pulsating drive signal has certain predetermined characteristics such as pulse duration, pulse frequency and pulse amplitude which generates a corresponding illuminance modulated light illuminance in the illumination zone below the outdoor luminaire 105. The lower level e.g. the second level of the pulsating drive signal may correspond to substantially zero light illuminance generated by the light source 109. The service device controller 123 detects a pulse height of the light illuminance signal or data which accurately reflects real light illuminance of the luminaire 105 because the detected pulse height is an expression of a difference between the light illuminance with an active light source 109 and light illuminance with substantially zero light illuminance of the light source 109.

Hence, the influence of background light pollution is suppressed or eliminated in the pulse height of the received light illuminance at the light sensor 103 as indicated on FIG. 3 below.

Another advantageous embodiment likewise exploits the pulsating light illuminance of the controllable light source, but applies frequency domain detection to suppress the background light pollution and determine the true light illuminance of the light source 109 as explained above in detail.

Figure 3:
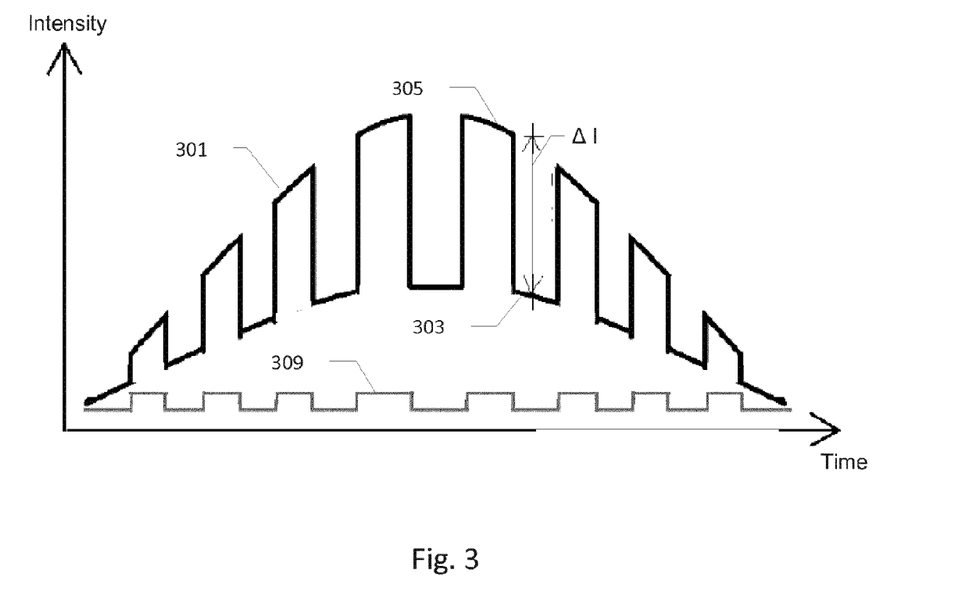
FIG. 3 illustrates a pulsating light illuminance of a controllable light source mounted in the outdoor luminaire in accordance with the preferred embodiment of the invention.

Curve 301 of FIG. 3 illustrates the pulsating light illuminance of the controllable light source 109 during measurement of the light illuminance by the light sensor mounted to the motorized service vehicle 101. The x-axis is time and the y-axis indicates light illuminance as measured by the light sensor 103 when the motorized service vehicle 101 passes through the illumination zone at the road level. The service device controller 123 is capable of accurately determining the light illuminance by measuring the illuminance difference, indicated schematically by Δl, between the minimum level of a single pulse 303 and the maximum level of the same pulse 305. Hence, background lighting pollution is effectively suppressed by the Δl determination. The lower curve 309 illustrates a synchronization signal generated by the service device controller 123 to control the timing of the pulsating drive signal applied to the controllable light source 109. This signal is generated by and used by the service device controller 123 to synchronize the illuminance measurement made by vehicle sensor 103, i.e. determine which mode or phase the light source 109 is currently in.

Figure 4:
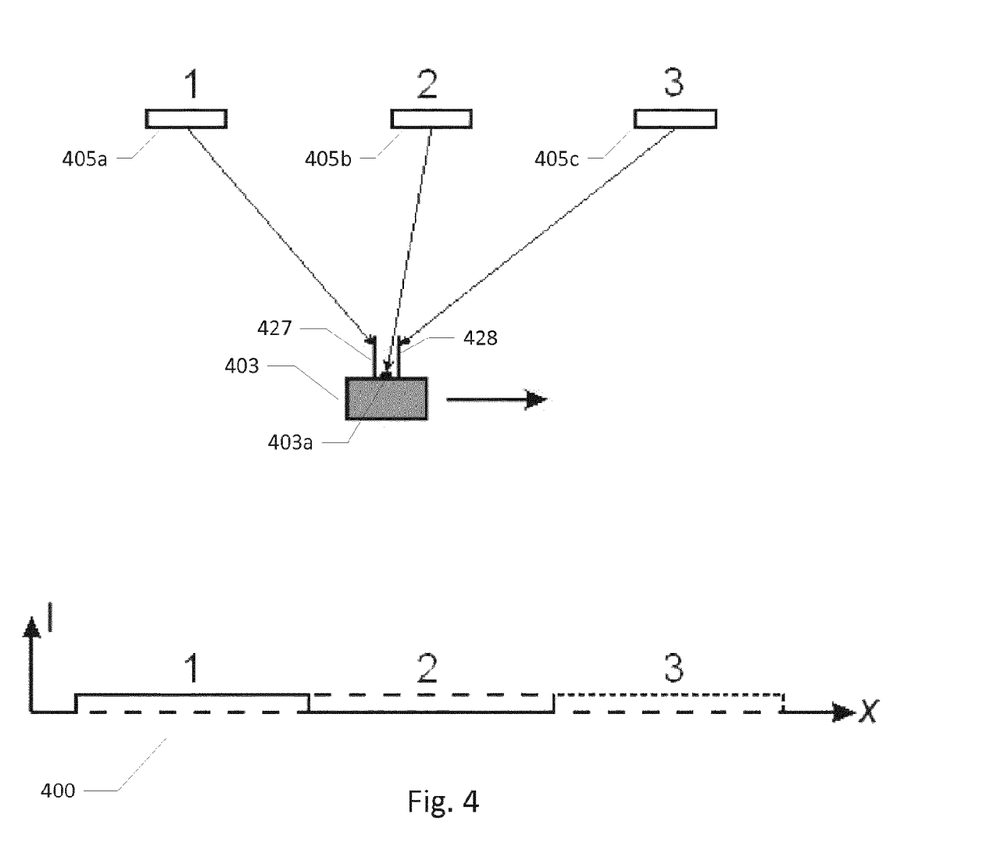
FIG. 4 illustrates a preferred embodiment of a light sensor for use in the above motorized service vehicle.

FIG. 4 illustrates a preferred embodiment of a light sensor 403 that may be used in the above motorized service vehicle. The drawing illustrates schematically how the light sensor 403 sequentially measures the respective light illuminance of three adjacently positioned outdoor luminaries 405a, 405b, 405c. In the present embodiment, the light sensor 403 comprises a pair essentially vertically protruding optic baffles 427, 428 that are placed around a photosensor 403a. During measurement of the light illuminance of e.g. the outdoor luminaries 405b, the optical baffles 427, 428 shield the photosensor 403a from polluting or interfering light illuminance generated by the adjacent outdoor luminaries 405a, 405c. This is schematically illustrated on the lower graph 400 where light illuminance (I) at the photosensor 403a versus its road position (X) is depicted.

The invention claimed is:

1. An illumination control system comprising a plurality of outdoor luminaries and a motorized service vehicle; each outdoor luminaire comprising:
   a controllable light source producing a light illuminance,
   a light source controller operatively coupled to the light source and configured to set or adjust a light illuminance of the controllable light source based on received light illuminance data,
   a first data communication unit configured to receive the light illuminance data from the motorized service vehicle or a remote central server through a wireless or wired communication link;
   the motorized service vehicle comprising:
   a light sensor configured to detect the light illuminance of the controllable light source,
   a service device controller operatively coupled to the light sensor to receive the detected light illuminance and compute the light illuminance data based thereon.

2. An illumination control system according to claim 1, wherein the service device controller is configured to store the respective light illuminance data of the plurality of outdoor luminaries on a data recording device of the motorized service vehicle.

3. An illumination control system according to claim 1, wherein the remote central server comprises:
   a data storage device for receipt of the stored light illuminance data held on the data recording device of the motorized service vehicle,
   a second data communication unit configured to transmit the respective light illuminance data to the light source controllers of the plurality of outdoor luminaires through the first wired or wireless communication links.

4. An illumination control system according to claim 1, wherein motorized service vehicle comprises:
a second data communication unit configured to wirelessly transmit the light illuminance data to the light source controller of the outdoor luminaire through the wired or wireless communication link.

5. An illumination control system according to claim 1, wherein the light sensor is firmly attached to a chassis structure or a body structure of the motorized service vehicle to fix an orientation of the light sensor.

6. An illumination control system according to claim 1, wherein the service device controller is adapted to compute the light illuminance data for each outdoor luminaire based on a comparison between the detected light illuminance at the light sensor and a predetermined or nominal light illuminance of the outdoor luminaire.

7. An illumination control system according to claim 6, wherein the light illuminance data comprises a relative increase or decrease of electrical power to be supplied to the controllable light source to reach the predetermined light illuminance of the out-door luminaire.

8. An illumination control system according to claim 1, wherein the light illuminance data comprises a night dimming profile reducing the light illuminance of the outdoor luminaire during a predetermined dimming time period of the day.

9. An illumination control system according to claim 3, wherein the first and second data communication units are further configured to exchange luminaire position data, or another unique identifier of each of the luminaires, through the wire-less communication link.

10. An illumination control system according to claim 9, wherein each of the luminaries comprises luminaire position data that is transmitted to the motorized service vehicle through the wireless communication link.

11. An illumination control system according to claim 1, wherein the data recording device comprises one or more of: {an optical disc drive, a magnetic disc drive, a non-volatile electronic memory}.

12. An illumination control system according to claim 1, wherein the light source controller is configured to pulsate the light illuminance of the controllable light source between a first illuminance level and a second illuminance level in response to a data command transmitted by the service device controller in the motorized service vehicle through the wireless or wired communication link.

13. An illumination control system according to claim 12, wherein the service device controller is configured to determine the light illuminance of the luminaire based on a measured light illuminance difference between the first and second illuminance levels at the light detector.

14. An illumination control system according to claim 1, wherein the motorized service vehicle comprises an optical spectrum analyser for determining a spectral distribution of light received at the light detector.

15. An illumination control system according to claim 1, wherein the motorized service vehicle comprises at least one of: {a car, a van, a motor cycle, a moped, a scooter, a Segway, an electrical bi-cycle}.

16. An illumination control system according to claim 1, wherein the controllable light source comprises one or more Light Emitting Diodes (LEDs).

17. An illumination control system according to claim 16, wherein the controllable light source comprises:
a set of white Light Emitting Diodes operatively coupled to the light source controller,
at least one coloured Light Emitting Diode operatively coupled to the light source controller;
wherein the light source controller is configured to, based on the received light illuminance data, selectively adjust the light illuminance of the set of white Light Emitting Diodes and the at least one coloured Light Emitting Diode to change the spectrum of the light emitted by the controllable light source.

18. An illumination control system according to claim 4, wherein the wired or wireless communication link comprises a wireless short-range RF communication link transmitting the light illuminance data directly between the second communication unit of the motorized service vehicle and each of the outdoor luminaries.

19. An illumination control system according to claim 18, wherein the short-range RF wireless communication link comprises at least one a Bluetooth communication interface, a Wi-Fi communication link, an optical communication link.

20. A motorized service vehicle for measuring a light illuminance of an outdoor luminaire, comprising:
a light sensor mounted on a motorized service vehicle and configured to detect the light illuminance generated by the outdoor luminaire,
a service device controller operatively coupled to the light sensor for receipt of a measured light illuminance signal and compute light illuminance data for the outdoor luminaire based thereon; and at least one of:
a data communication unit configured to transmit the light illuminance data to the outdoor luminaire through a wireless communication link to the outdoor luminaire; and
a data recording device configured to store the respective light illuminance data of the plurality of outdoor luminaries.

21. A method of setting or adjusting light illuminance of an outdoor luminaire from a bypassing motorized service vehicle; the method comprising steps of:
driving the motorized service vehicle to a road position within an illumination zone of the outdoor luminaire,
detecting a light illuminance generated by a controllable light source of the outdoor luminaire by a light sensor mounted on the motorized service vehicle,
comparing the detected light illuminance to a predetermined or nominal light illuminance of the luminaire,
computing light illuminance data for the outdoor luminaire based on the comparison,
transmitting the computed light illuminance data from the motorized service vehicle or from a remote central server to the outdoor luminaire through a wired or wireless communication link,
adjusting a light illuminance of the controllable light source in accordance with the received light illuminance data by a light source controller operatively coupled to the controllable light source.

22. A method of setting or adjusting light illuminance of an outdoor luminaire from a bypassing motorized service vehicle according to claim 21, comprising a further step of:
wirelessly transmitting the light illuminance data from the motorized service vehicle to the light source controller of the outdoor luminaire through a wireless communication link during passage of the outdoor luminaire.

23. A method of setting or adjusting light illuminance of an outdoor luminaire from a bypassing motorized service vehicle according to claim 21, comprising a further step of:
transmitting a data command from the service device controller to the light source controller through the wireless communication link to pulsate the light illuminance of the controllable light source between a first illuminance level and a second illuminance level.

24. A method of setting or adjusting light illuminance of an outdoor luminaire from a bypassing motorized service vehicle according to claim 23, comprising a further step of:
determining the light illuminance of the luminaire based on a measured light illuminance difference between the first and second illuminance levels at the light detector.

25. A method of setting or adjusting light illuminance of an outdoor luminaire from a bypassing motorized service vehicle according to claim 23, comprising further steps of:
pulsating the light illuminance of the luminaire at a predetermined pulsation frequency,
computing an optical spectrum of the detected light illuminance,
detecting the light illuminance generated by the controllable light source based on the optical spectrum.

\* \* \* \* \*